(No Model.) 3 Sheets—Sheet 2.

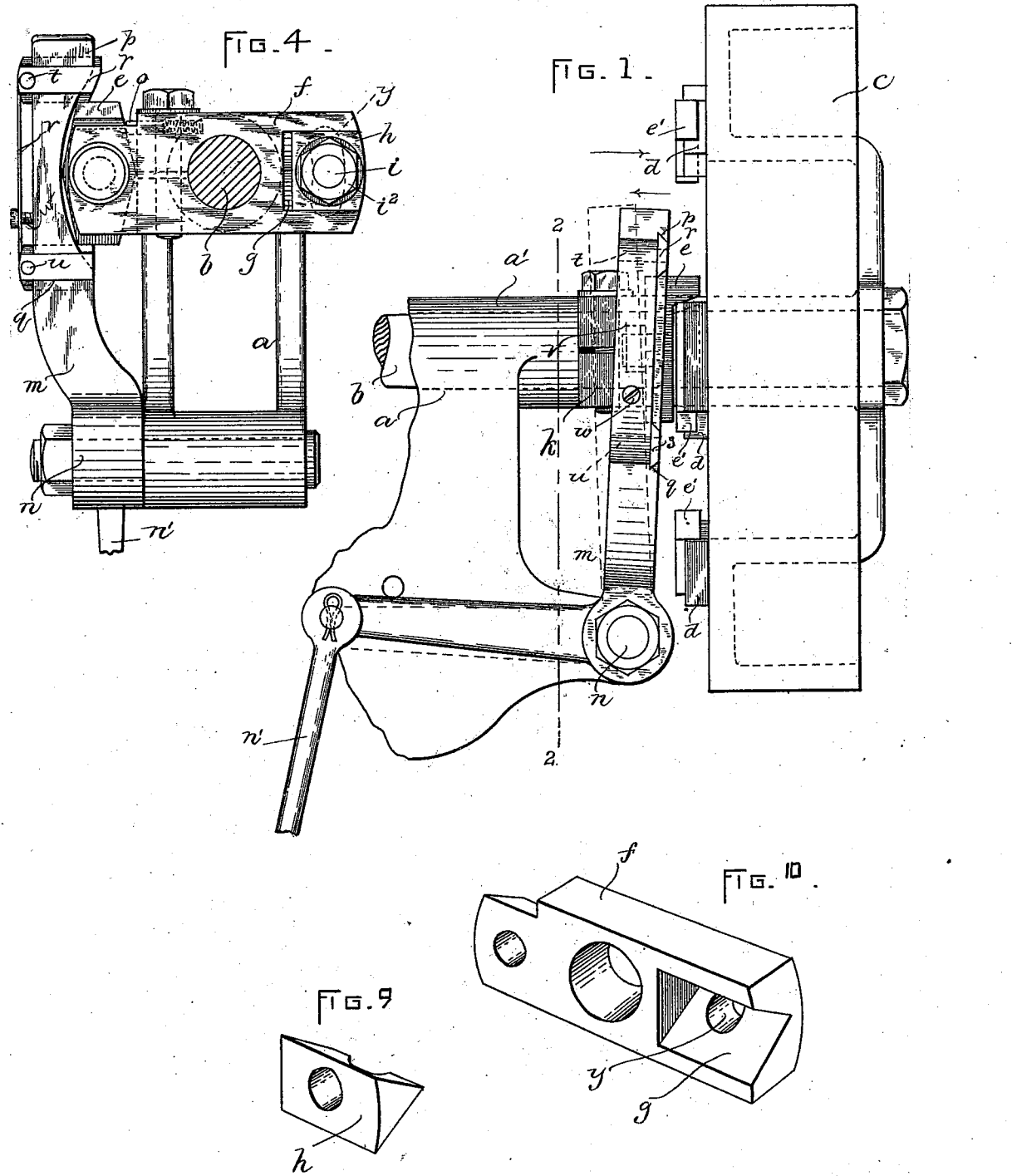

H. H. CUMMINGS.
STOP MOTION.

No. 510,677. Patented Dec. 12, 1893.

WITNESSES:
A. D. Harrison
W. S. McLeod

INVENTOR:
H. H. Cummings

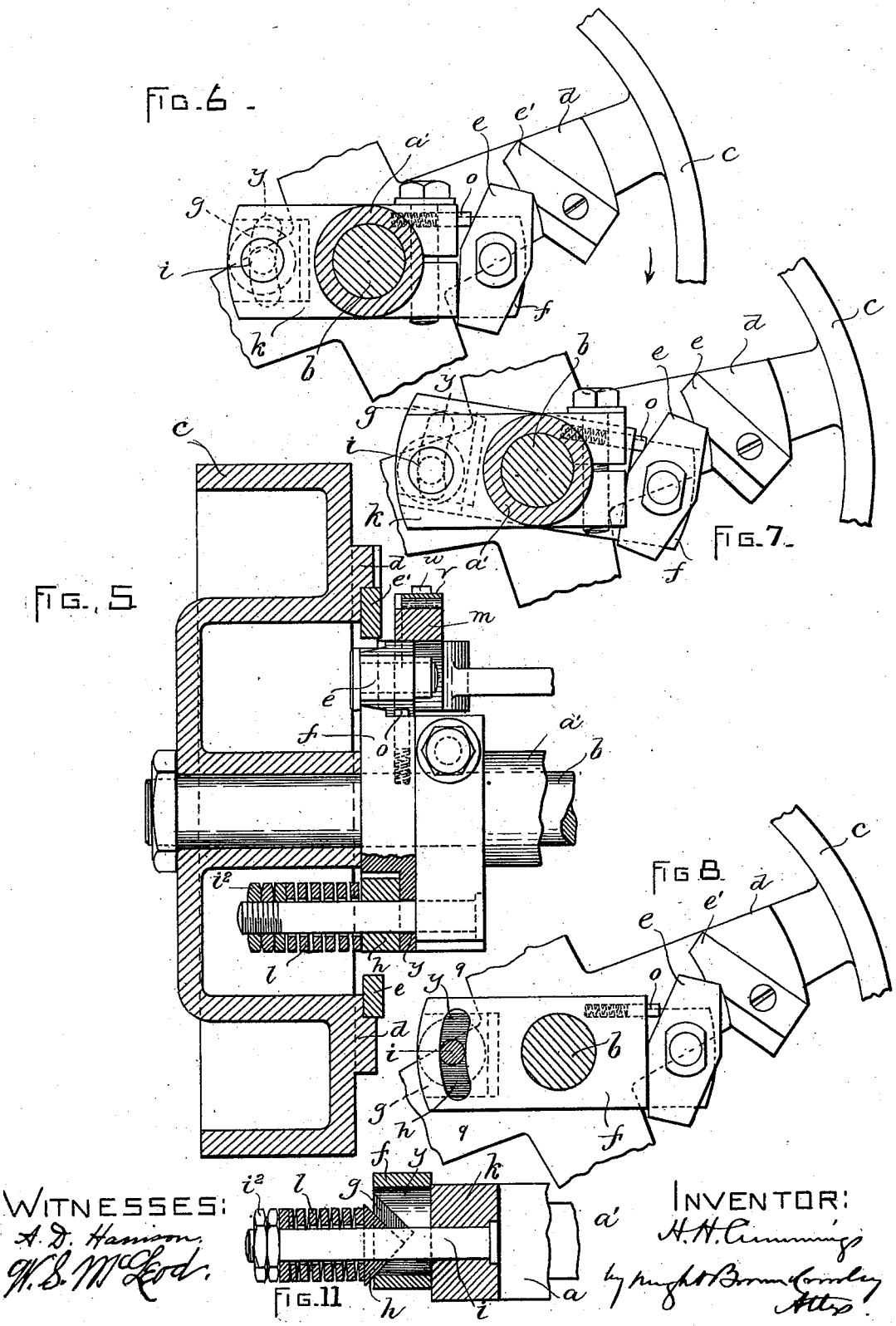

UNITED STATES PATENT OFFICE.

HENRY H. CUMMINGS, OF MALDEN, MASSACHUSETTS.

STOP-MOTION.

SPECIFICATION forming part of Letters Patent No. 510,677, dated December 12, 1893.

Application filed March 16, 1893. Serial No. 466,261. (No model.)

*To all whom it may concern:*

Be it known that I, HENRY H. CUMMINGS, of Malden, in the county of Middlesex and State of Massachusetts, have invented certain new and useful Improvements in Stop-Motions or Clutches, of which the following is a specification.

This invention relates to means for connecting a continuously running driving pulley with the shaft to which it imparts motion, and disconnecting said pulley from the shaft, and it has for its object to provide improved means for connecting the pulley with the shaft in such manner as to prevent an undesirable shock or jar when the connection is being established.

The invention consists in certain improvements whereby the connection or engagement between said driving mechanism and the driving shaft is made yielding as I will now proceed to describe.

Figure 3:
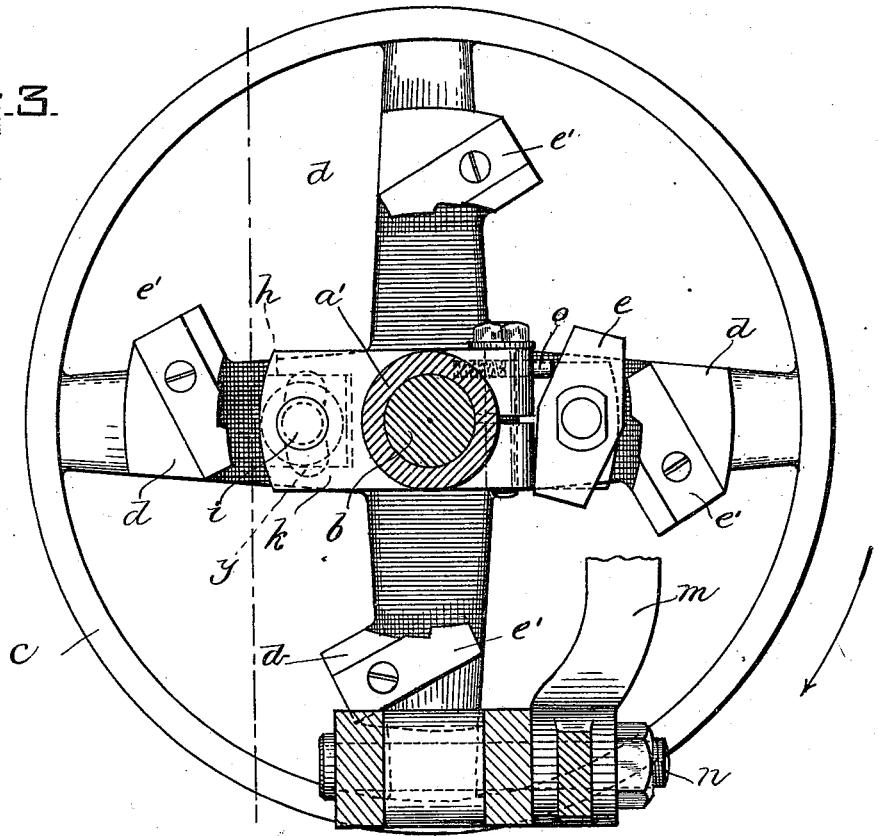
Figure 2:
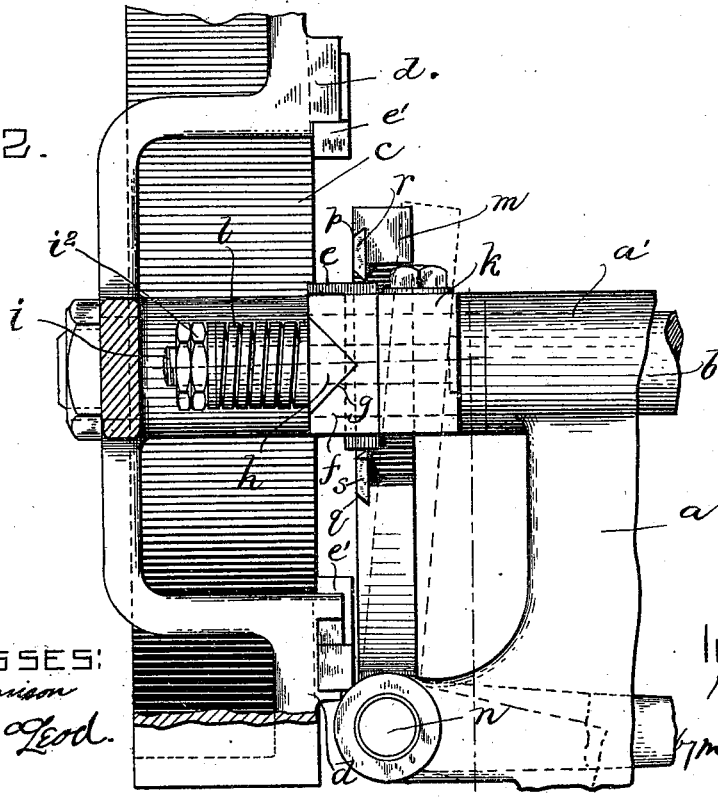

Of the accompanying drawings forming a part of this specification, Figure 1 represents a side elevation of a pulley and mechanism embodying my invention. Fig. 2 is a view of the opposite side of the machine shown in Fig. 1, parts of the pulley being broken away. Fig. 3 is a section on line 2 2, Fig. 1, looking in the direction of the arrow 2, the operating lever being broken off. Fig. 4 is an end view with the pulley removed, the shaft being shown in section. Fig. 5 is a plan view of the mechanism, the pulley being shown in section. Figs. 6, 7, 8, 9, 10, and 11 are detail views hereinafter described.

The same letters of reference indicate the same parts in all the figures.

In the drawings—$a$ represents a portion of the supporting frame of a machine which is or may be a boot or shoe nailing machine, said frame having bearing $a'$ in which is journaled a driving shaft $b$. The shaft $b$ has upon its outer end a pulley $c$ adapted to rotate loosely on the shaft. The arms of the pulley are provided with lugs or projections $d$ to which are affixed dogs or catches $e'$ adapted to engage with a carrier or pawl $e$ connected with the driving shaft through intermediate devices adapted to impart motion from the pulley to the shaft as will be presently described. The carrier $e$ is pivotally secured to one end of a block $f$ loosely mounted upon the driving shaft. The opposite end of the block $f$ is provided with a V-shaped groove $g$ into which is fitted a V-shaped piece $h$ secured therein by a bolt $i$ attached to a block $k$ rigidly secured to the shaft, said bolt being of sufficient length to support a spring $l$ interposed between the piece $h$ and nuts $i^2$ on the bolt, the arrangement being such that the V-shaped piece $h$ is held in contact with the groove $g$ by the spring $l$ with a pressure slightly in excess of the power required to rotate the shaft, so that when one of the catches $e'$ upon the pulley arms first strikes the carrier $e$ in connecting the pulley with the shaft, said carrier and the block $f$ will yield upon the shaft sufficiently to prevent undue shock to the mechanism.

$m$ represents a bell crank lever pivoted at $n$ to the supporting frame $a$. The upper arm of said lever $m$ is adapted to engage the carrier $e$ as shown in Fig. 4, and normally hold it out of the path of the catches $e'$ upon the pulley arms. The lower or horizontal arm of the lever $m$ is connected at its outer end with a rod $n'$ which is connected at its lower end with a treadle (not shown) whereby it may be depressed to move the bell crank lever $m$, so that the vertical arm of said lever may be moved out of contact with the carrier $e$ and permit the latter to be forced outwardly so that its upper end may be brought into the path of the catches on the pulley arms as shown in Fig. 7.

The block $f$ is provided with a socket which contains a spring pressed pin $o$ which normally presses against the upper portion of the carrier, as shown in Fig. 7, the arrangement being such that when the vertical arm of the bell crank lever $m$ is removed from contact with the carrier by the depression of the treadle said carrier is forced by the spring pressed pin $o$ into the path of one of the catches as hereinbefore explained. The upper end of lever $m$ is provided with dovetail grooves $p$ $q$ in which are fitted slides $r$ $s$ adapted to engage the carrier $e$ for a purpose to be presently described. Said slides are provided with pins $t$ $u$ at their outer ends, against which bears a spring $v$ which is secured to the bell crank lever $m$ by a screw $w$.

Said pins serve as stops to limit the movement of the slides inwardly toward the carrier while the spring acts as an elastic stop in the opposite direction.

The clutch mechanism is inoperative when in the position shown in Figs. 1 and 4, in which position the lever *m* is in contact with the carrier *e* and holds it normally out of the path of the catches *e'* upon the pulley, so that the pulley is adapted to rotate continuously upon the shaft without rotating the latter. When the shaft is to be rotated the horizontal arm of the lever *m* is depressed, thus removing the vertical arm from contact with the carrier *e* and permitting the carrier to be turned upon its bearing by the spring-pressed pin *o*, so that the upper portion of the carrier is forced outwardly and engaged by one of the catches *e'* upon the driving pulley arms. Motion is therefore imparted from the pulley to the carrier *e* and from the latter to the shaft through the medium of its attached block *f* and the connection of the latter with the block *k* upon the driving shaft.

The loose block *f* to which the carrier *e* is attached is provided with a slot *y*, Fig. 10, through which the bolt *i* passes, so that when contact is made between the driving pulley and the carrier *e* on said block, the carrier and block yield in the direction of the rotation of the pulley, as shown in Fig. 7. Said yielding movement is permitted by the spring *l*, which is compressed as shown in Fig. 11 by the pressure exerted against the V-shaped piece *h* by the block *f* when a catch *e'* on the driving pulley strikes the carrier *e*. The compression of the spring is not sufficient however to permit the removal of the V-shaped piece *h* from the groove in the block *f*. Hence said piece connects the block *f* with the shaft under all circumstances, the connection being yielding to a sufficient extent to prevent injurious shock or jar when the pulley is first engaged with the shaft as above described. The shape of the block and the spring pressure thereon cause the block to assume its normal position as shown in Fig. 2, after the starting operation. The pulley is disconnected from the shaft by the release of the bell crank lever *m* by the operator, said lever being thereupon returned to the position shown in Figs. 1 and 4 by any suitable means, such as a spring connected with the operating treadle. The carrier revolving with the pulley is brought into contact with the slide *v* upon the lever *m*, which slide presses the upper portion of said carrier out of engagement with the catch upon the driving pulley, the slide yielding slightly against its spring and gradually checking the speed of the shaft while in contact with the carrier, and permitting the bottom end of the latter to come into less forcible contact with the bottom slide *s*, whereby the shaft is brought to a stop, as will be readily understood by reference to Fig. 4.

In high speed machines of intermittent movements, the transmission of motion from the driving pulley to the shaft is attended by a sudden shock or jar upon the mechanism employed, which is objectionable inasmuch as the durability of the machine is affected, and when frictional devices are employed, the strain upon the latter is excessive when running at a high rate of speed. By the use of my improved clutch I am enabled to reduce the friction to a minimum and also to obviate the shock or jar occasioned by the contact of the driving pulley with the devices connecting it with the shaft. The shock or jar attending the stoppage of the machine is also cushioned, or obviated by the same mechanism.

I claim—

1. A positive clutch for connecting rotary machine elements, the same comprising a member carried by one of the rotary elements, a member carried by the other rotary element and capable of a limited rotary movement independent thereof and receiving the direct impact of connection, and a cushion between said latter member and the rotary element which carries it, said cushion adapted to absorb the shock of connection.

2. The combination of a loose pulley having a catch or clutch member, a shaft supporting said pulley, an arm mounted to turn loosely on the shaft and provided with a pivoted carrier or clutch member adapted to engage said catch and with a V-shaped recess, and a V-shaped block connected with the shaft and yieldingly pressed into said recess, said block constituting a yielding connection between the said arm and shaft, as set forth.

3. The combination of a loose pulley having a catch or clutch member, a shaft supporting said pulley, a block *k* affixed to the shaft and provided with a stud *i*, an arm mounted to turn loosely on the shaft beside the block, and provided with a V-shaped recess through which said stud passes, a V-shaped block movable on the stem and pressed into said recess by a spring on said stud, and a spring pressed carrier or clutch member pivotally connected with said arm, as set forth.

4. The combination of a loose pulley having a catch or clutch member, a shaft supporting said pulley, an arm yieldingly connected with said shaft, a carrier or clutch member pivotally connected with said arm and provided with a spring whereby it is normally held in position to engage said catch, and a device whereby the carrier is automatically displaced from its catch engaging position, said device being adapted to be moved by the operator into position to release the carrier and permit its engagement with the pulley catch, as set forth.

5. The combination of a loose pulley having a catch or clutch member, a shaft supporting said pulley, an arm yieldingly connected with said shaft, a carrier or clutch member pivotally connected with said arm and provided with a spring whereby it is normally held in position to engage said catch, a pivoted lever having yielding slides and normally held in position to cause said slides to engage and displace said carrier, said lever being adapted to be moved by the operator into position to release the carrier, as set forth.

In testimony whereof I have signed my name to this specification, in the presence of two subscribing witnesses, this 10th day of March, A. D. 1893.

HENRY H. CUMMINGS.

Witnesses:
C. F. BROWN,
A. D. HARRISON.